United States Patent Office 3,335,001
Patented Aug. 8, 1967

3,335,001
PRODUCTION OF COMPOSITE METALLIC
BILLETS BY POWDER METALLURGY
John H. Drew and Arthur James Stevens, both of
78 Hatton Garden, London E.C. 1, England
No Drawing. Filed July 6, 1966, Ser. No. 563,024
Claims priority, application Great Britain, July 19, 1965,
30,535/65
11 Claims. (Cl. 75—208)

This invention relates to the production of composite metallic billets or compacts by powder metallurgical procedures and is more particularly, but not necessarily exclusively, concerned with the production of powder compacts for use in the manufacture of rivet-type electrical contacts comprising a body and/or shank portion of base metal and a contact head or facing layer of noble metal.

Composite metallic powder compacts for the manufacture of electrical contacts may be made by forming a powder mixture composed of one or more layers of base metal powder and one or more layers of noble metal, compressing this powder mixture to form a compact and sintering the so-formed compact at a suitable temperature to form a composite billet or tablet. To form a rivet-type electrical contact from this billet, the latter may be subjected to one or more repressing or coining operations to extrude the shank from the base metal portion and form the finished contact.

In some instances, the repressing or coining operation may involve considerable deformation of the unextruded portion of the billet, for example, in cases in which the final dimensions of the contact head are required to differ from those of the billet. This subsequent treatment of the billet demands a degree of malleability and strength of particle bond which is not always attainable. The malleability and bond-strength of the billet may indeed be to some extend improved by additional compacting and sintering steps prior to the coining operation. Such additional steps clearly complicate the manufacturing procedure and increase the cost of production and are, in consequence undesirable.

The aforesaid lack of sufficient malleability and bondstrength of single stage compacted and sintered billets is found to be particularly noticeable in the case of billets made from the powders of metals which form with one another a eutectic alloy, since in order to attain the greatest possible malleability and strength, the sintering temperature employed should be as high as possible, that is to say, only slightly below the melting temperature of the lowest melting point metal constituent of the compact. Thus, a compact formed from silver and copper metal powders cannot be successfully sintered at the ideal temperature, namely, slightly below the melting point of the silver constituent, for example, at about 900° C., owing to the fact that a silver-copper eutectic alloy will be formed, at a temperature of 778° C., at the interface of the copper-silver layers of the compact thereby having a deleterious effect on the bond-strength and/or malleability of the resulting billet. Silver-copper billets, in the manufacture of which a single sintering step at a necessary temperature of below 778° C. is used have been found to be brittle and to have a poor bond strength with the result that they cannot be successfully subjected to extensive repressing or coining operations referred to hereinbefore.

An object of this invention, therefore, is to provide an improved method of producing composite metallic billets or compacts by powder metallurgical procedures which is not subject to the disadvantages associated with existing methods of billet production.

Another object of the invention is to provide a method of making composite metallic billets by powder metallurgy having a degree of malleability and bond strength superior to those of composite billets formed from similar metals by existing methods of production.

A further object of the invention is to provide an improved method of making a composite silver-copper powder compact or billet for use in the manufacture of electrical contacts.

With the above and other objects mainly in view, the invention broadly contemplates a method of making a composite metallic billet in which first and second layers of different metal powders, capable together of forming a eutectic alloy are compressed to form a compact which is subsequently sintered to form a composite billet wherein there is interposed, between the first and second layers of the eutectic alloy-forming metal powders, an intermediate layer of powder of a metal which, when the compact is sintered does not form a eutectic alloy with either of the metals of the first and second layers whereby the intermediate layer is bonded to the first and second layers during sintering at a temperature above the eutectic forming temperature of the metals of the first and second layers.

The method of the invention will be found to be particularly suitable for making composite silver-copper billets, intended for subsequent fabrication into rivet-type electrical contacts in the manner above referred to, as a single sintering step may be used at a sufficiently high temperature to produce a billet having adequate malleability and bond-strength for the purpose.

In carrying out the invention in practice, the intermediate or barrier layer may be formed of any metal powder which will not, on heating, form a eutectic alloy with the metal of either of its contiguous layers but will, on the other hand, become firmly bonded to both of them during sintering. In the case of silver-copper contact billets, an iron group metal powder may advantageously be used, nickel powder having been found particularly suitable for the purposes of the invention.

One embodiment of the invention will now be described, by way of example, by reference to the production of a silver-copper billet suitable for subsequent fabrication into a rivet-type electrical contact having a copper body and/or shank and a silver contact head or contact face, it being clearly understood that the invention is in no way limited to, or by, this example.

A powder compact is made in a suitable tabletting press by first lightly compressing in the die of the press the required amount of copper powder, then adding a layer of nickel powder, lightly compressing this layer also and then adding the required amount of silver powder. The layered powder fill is then compacted to the required density. For example, a charge comprising about 0.450 g. of copper powder, 0.020 g. of nickel powder and 0.150 g. of silver powder may be compressed into tablets or billets of diameter of 0.165 inch and an overall length of about 0.218 inch.

The so-formed compact is then passed through a sintering furnace containing an atmosphere of cracked ammonia, where the compact is sintered at a temperature of about 900° C. for a period of about 30 minutes, and is then allowed to cool to about 75° C., whilst remaining in the same atmosphere.

The sintered billet is then fabricated into a rivet-type electrical contact by a coining operation to extrude a shank of about 0.050 inch in length and about 0.120 inch in diameter from the flat face of the copper layer and then cold forging the unextruded portion, including the silver layer, to form a cylindrical contact head of about 0.25 inch in diameter and 0.070 inch in thickness.

In a modification of the method of the invention, instead of compacting individual billets, a composite strip may first be formed and individual billets stamped therefrom.

As will be appreciated, by means of the invention, there is provided, a simple and efficient method of making a composite metallic billet by powder metallurgical procedures, which involves a single sintering step at a temperature, which is sufficiently high to produce a malleable adherently bonded billet, which may be readily fabricated to form a rivet-type electrical contact composed of different metals which are capable of forming a eutectic alloy, the melting temperature of which is lower than the sintering temperature employed.

It is to be understood that the invention is intended to include within its scope composite billets when prepared by the method of the invention and rivet-type electrical contacts fabricated from such billets.

What we claim is:

1. A method of manufacturing a composite metallic billet from powders of two different metals, which form a eutectic alloy when compressed and subsequently sintered to form a composite billet, which consists in lightly compressing an amount of one of said different metal powders, applying to one surface of said slightly compressed powder a covering layer of powder of a third metal unable on heating to form a eutectic alloy with either of said different metals but capable of forming a firm bond with each of said different metals during a sintering operation, applying to said covering layer of powder an amount of powder of the second of said different metals, compressing the powder layers to form a compact of the required density, heating said compact in a reducing atmosphere to a sintering temperature which is above the eutectic forming temperature of the said different metals to sinter said powders whereby said layer of powder of the third metal is bonded to the powder layers of said different metals and cooling said sintered compact in a reducing atmosphere.

2. A method according to claim 1 wherein the different metallic powders of the first and second layers are silver and copper and the intermediate layer is an iron group metal powder.

3. A method according to claim 2 wherein the intermediate layer is made from nickel powder.

4. A method according to claim 2 wherein the intermediate layer is a silver powder coated with nickel.

5. A method according to claim 2 modified in that the silver layer comprises a mixture of silver and nickel powders.

6. A method according to claim 5 wherein the said mixture is predominantly silver.

7. A method according to claim 2 modified in that the copper layer comprises a mixture of copper and tin powders.

8. A method according to claim 7 wherein the mixture of copper and tin is predominantly copper.

9. A method according to claim 2 wherein the copper layer includes a small proportion of precious metal.

10. The method as claimed in claim 9 wherein said precious metal is silver.

11. In a method of manufacturing a metallic composite billet from powders of two different metals which form a eutectic alloy when compressed and sintered while in direct contact, comprising forming one or more layers of base metal powder and one or more layers of noble powder, comprising the resultant layers of powder to form a compact and sintering the resultant compact at a suitable temperature to form a composite billet or tablet, the improvement comprising (a) lightly compressing one of said metal powders, (b) applying to one surface of said lightly compressed powder a covering layer of powder of a third metal which is unable on heating to form a eutectic alloy with either of said two different metals, but capable of forming a firm bond with each of said two different metals during a sintering operation, (c) applying to said covering layer of said third metal powder the second of said two different metal powders, (d) compressing the powder layers to form a compact of a required density, (e) heating said compact in a reducing atmosphere to a sintering temperature which is above the eutectic forming temperature of the said two different metals, (f) and cooling said sintered compact in a reducing atmosphere, whereby the layer of powder of the third metal is firmly bonded to the layers of powder of the said two different metals without appreciable eutectic formation, thereby producing a stronger sintered compact.

References Cited

UNITED STATES PATENTS

| 2,195,307 | 3/1940 | Hensel | 29—199 X |
| 2,474,038 | 6/1949 | Davignon | 29—199 X |
| 3,123,471 | 3/1964 | Marshall | 75—208 |

FOREIGN PATENTS 526,495   6/1956   Canada.

CARL D. QUARFORTH, *Primary Examiner.*

BENJAMIN R. PADGETT, *Examiner.*

A. J. STEINER, *Assistant Examiner.*